United States Patent [19]

Caprio et al.

[11] Patent Number: 5,171,587
[45] Date of Patent: Dec. 15, 1992

[54] AMINO ACID MODIFIED FOOD FOR ICTALURID CATFISH AND FISH WITH SIMILAR FEEDING BEHAVIOR

[75] Inventors: John T. Caprio, Baton Rouge, La.; Tine B. Valentincic, Ljubljana, Yugoslavia

[73] Assignee: The Board of Supervisors of Louisiana State University and Agricultural and Mechanical College, Baton Rouge, La.

[21] Appl. No.: 742,361

[22] Filed: Aug. 8, 1991

Related U.S. Application Data

[63] Continuation-in-part of Ser. No. 575,983, Aug. 31, 1990, abandoned.

[51] Int. Cl.⁵ .............................................. A01K 85/00
[52] U.S. Cl. ............................................ 426/1; 426/2; 426/508
[58] Field of Search ................... 426/1, 2, 508; 424/84

[56] References Cited

U.S. PATENT DOCUMENTS

| | | | |
|---|---|---|---|
| 3,988,466 | 10/1976 | Takagi et al. | 514/561 |
| 4,693,897 | 9/1987 | Johnsen et al. | 426/2 |
| 4,704,286 | 11/1987 | Rittschof et al. | 426/1 |
| 4,752,480 | 6/1988 | Charbonnier et al. | 426/1 |
| 4,826,691 | 5/1989 | Prochnow | 426/1 |
| 5,089,277 | 2/1992 | Prochnow | 426/1 |

OTHER PUBLICATIONS

*Journal of Comparative Physiology*, "An Electro physiological . . .", pp. 150:345–357 (1983).
*Comparative Biochem. Physio.*, "High sensitivity of catfish taste . . .", vol. 52A pp. 247–251 (1975).
*Chemoreception in Fishes*, "High Sensitivity . . ." Chapter 7, pp. 109–134 (1982).

*Primary Examiner*—Marianne M. Cintins
*Assistant Examiner*—John Peabody
*Attorney, Agent, or Firm*—William David Kiesel; Robert C. Tucker

[57] ABSTRACT

The snapping and biting response of ictalurid catfish, and fish with similar feeding habits, are released by the use of the free amino acids: L-proline, L-alanine, and L-arginine, and mixtures thereof, at concentrations above those normally found around the fish's normal, or natural foods.

7 Claims, 7 Drawing Sheets

AMINO ACID MODIFIED FOOD FOR ICTALURID CATFISH AND FISH WITH SIMILAR FEEDING BEHAVIOR

This is a continuation-in-part of copending application Ser. No. 07/575,983 filed on Aug. 31, 1990 which is now abandoned.

FIELD OF THE INVENTION

This invention relates to the use of the free amino acids: L-proline, L-alanine, L-arginine, and mixtures thereof, to release the snapping and biting response of ictalurid catfish, and fish having similar feeding behavior. The amino acids are incorporated into the food so that in water, they are present around the food at concentrations above those which are normally found around fish's normal or natural foods.

BACKGROUND OF THE INVENTION

The feeding behavior of fish consists of two phases: (1) an appetitive phase which includes an orienting response and a food search response, and (2) a consummatory phase which includes a snapping/biting response, masticating, and a swallowing response. The discovery of an agent that stimulates the biting response of fish would be of value for increasing food intake, not only to sport and commercial fishermen, but also to commercial fish pond owners.

In most fish, including members of the ictalurid family, such as channel catfish (Ictalurus punctatus), the chemical stimuli in the environment are detected by both their olfactory and gustatory receptors. Neurophysiological studies have shown that both the olfactory and the gustatory receptors of most fish, including iotalurid catfish, are sensitive to amino acids, such as those found in the natural substances on which fish feed (e.g., tissues of worms, mollusks, crustaceans, insects, amphibians, and teleosts).

Much work has been done in associating various amino acids with both gustatory and olfactory receptors in fish, particularly ictalurid catfish. See for example: "High Sensitivity of Catfish Taste Receptors to Amino Acids", by John Caprio, *Comparative Biochemical Physiology*, 1975, Vol. 52A, pp 247–251; "High Sensitivity and Specificity of Olfactory and Gustatory Receptors of Catfish to Amino Acids", by John Caprio, *Chemoreception in Fishes*, Elsevier Scientific Publishing Co., Amsterdam, 1982, Chapter 7, pp 109–1241; "An Electrophysiological Investigation of the Oro-Pharyngeal (IX-X) Taste System in the Channel Catfish, Ictalurus punctatus", by J. S. Kanwal and J. Caprio, *Journal of Comparative Physiology*, vol.150, 1983, pp 345–357; and "Receptor Sites For Amino Acids in the Facial Taste System of the Channel Catfish", by S. Wegert and J. Caprio, *Journal of Comparative Physiology A*, vol. 168, 1991, pp 201–211. While much work has been reported in the above articles, as well as others not listed above, with regard to the sensitivity of various gustatory and olfactory receptors to the amino acids, all of this work was from electrophysiological studies—not behavioral studies. That is, while experiments can be conducted to show that various receptors of a fish are sensitive to a particular agent, they cannot predict the behavior which will be associated with that particular agent. For example, it has been observed that a particular amino acid may either attract or repel fish, or even cause no behavior response, depending upon other past or present stimulations to the fish.

Even in those cases where fish have been attracted by the presence of certain compounds, the attraction has not been consistently followed by a increase in the feeding activity of the fish. Also, while a gustatory receptor may be equally sensitive to one stimulus which is sweet in taste, and another which is bitter or salty in taste, the behavior of the animal can be the opposite for each stimulus. In fact, of the three amino acids of the present invention for releasing the snapping/biting response, one, at least to humans, is very bitter (L-arginine) and another is sweet (L-alanine). Consequently, the fact that a particular agent can trigger an electrophysiological response in a receptor of a fish, it does not predict the corresponding behavior the fish will have to that agent.

In commercial catfish pond farming, it is desirable to utilize techniques which encourage pond catfish to feed on the food placed in the pond in order to obtain faster growth for the production of a higher quality fish fillet, as well as more efficient utilization of the food supplied to the pond. Another problem in commercial pond catfish farming results when the fish are placed under stress. This can occur during their movement into the pond from another location or environment, and also in disease. When in a state of stress, the fish often have a tendency not to eat. This can result in the loss of a substantial number of fish before they adapt to their new environment. Thus, it is important that the fish feed as soon as possible on the food supplied to them by the pond farmer.

While various attempts have been made to encourage fish to snap and take a particular food, or lure, there still exits a substantial need in the art for improved methods and chemical agents for accomplishing this.

SUMMARY OF THE INVENTION

Therefore, it is an object of the present invention to provide an agent that can release the snapping/biting response of fish, particularly ictalurid catfish, and other fish having similar feeding behavior.

Another object of the present invention is to provide fish food which contains such an agent.

Other objects and advantages of this invention will become apparent from the ensuing descriptions of this invention.

In accordance with the present invention, there is provided an improved food for causing ictalurid catfish, and fish with similar feeding behavior to consume said food, the improvement which comprises the addition of an effective amount of: (a) one or more of the free amino acids: L-alanine, L-arginine, and L-proline; or (b) a protein precursor of said amino acids, that upon the action of a proteolytic enzyme will produce said one or more amino acids, or a mixture of (a) and (b); wherein said effective amount the fish.

In a preferred embodiment of the present invention, an effective amount of said free amino acids in the food would be at least that amount, which when placed in water, would result in plumes having a molar concentration of at least about 0.001M for L-alanine and L-proline, and at least about 0.0001M for L-arginine.

In a another preferred embodiment of the present invention, an amino acid precursor is used, which upon action of a proteolytic enzyme, yields L-alanine, L-arginine, and L-proline in the appropriate amounts.

PREFERRED EMBODIMENTS OF THE INVENTION

It has now been found, by the inventors hereof, that the initial responses of the consummatory phase of the feeding behavior (i.e. the biting or snapping response) in ictalurid catfish can be released by one or more of the following free amino acids at supranatural concentrations: L-proline, L-alanine, and L-arginine. By the term, "supranatural concentrations", we mean that any one or more the three amino acids must be present in concentrations greater than those which normally come from the natural food of the fish and which are found in the water around the food. Typically, the concentrations of these amino acids around the natural food of icaturid catfish does not exceed about 0.001M. By the practice of the present invention, additional amounts of one or more of the three amino acids are added in an effective amount. The term "effective amount" means that enough of the amino acids is added such that when the amino acid modified food is placed in water, stimulus plumes are formed which are comprised of an aqueous solution of stimuli, which are the one or more free amino acids: L-alanine, L-arginine, and L-proline. The molar concentrations of these plumes will be at least about 0.001M for L-alanine and L-proline, and at least about 0.0001M for L-arginine. The upper limit for the molarity of the plumes will be governed by the solubility limit for L-alanine and L-proline. The solubility limit for L-proline is about 15M, and for L-alanine about 2M The upper limit for L-arginine will be determined by its inhibitory effects on the snapping and biting response at higher concentrations. For example, at contact concentrations of greater than about 0.1M, L-arginine causes stereotypic hyoid movements, which inhibit feeding.

These same amino acids are expected to control the biting behavior in other fish species, such as cyprinid and scienid fish, that have similar feeding behavior as the ictalurids. By "similar feeding behavior" we mean fish whose intake of food (the turning and biting at food) is primarily controlled by chemosensory receptors of the fish.

When the food, containing the amino acids of the present invention, or a preoursor thereof, is introduoed into the water containing the fish, the amino acids begin to dissolve and become distributed within the body of water. The distribution of a soluble substance emanating from a point source in water is not homogeneous, nor is it a simple gradient. The diffusion gradients are established at distances up to a few millimeters away from the stimulus source. The stimulus is carried away from the source by micro-currents in the form of stimulus plumes contained in single water eddies. That is, if one were to measure the concentration of the dissolved substance at set distances from its point source as a function of time, the reading would uncover peaks of higher concentration of the delivered chemical at various distances. See "High Resolution Spatiotemporal Analysis of Aquatic Chemical Signals Using Microelectrochemical Electrodes", by P. A. Moore et al., *Chemical Senses*, 14(6):829–840, 1989, and which is incorporated herein by reference.

Any of the three free amino acids: L-alanine, L-arginine and L-proline, can be used alone, or in any combination thereof, to release snapping and biting in ictalurid catfish. L-arginine is the most effective stimulus at low concentrations, but does not show concentration dependence at higher concentrations. L-proline and L-alanine are more effective at the higher concentrations at releasing the snapping and biting response than is L-arginine. Thus, if the three amino acids are used as a mixture, they complement one another across the concentration scale. L-proline has the strongest concentration dependence of the three amino acids, and thus at higher concentrations it alone releases most of the biting or snapping response. In addition, all three amino acids release searching responses; however, at low concentrations, L-arginine and L-alanine are more effective at releasing this behavior than L-proline. Thus, their inclusion in the mixture increases the chances that the fish will approach the lure or feed. Once the fish is in the vicinity of the food, the amino acids of the present invention will cause the fish to snap and take the food.

While it is conceivable that aqueous solutions of the amino acids can be introduced directly into the body of water containing the fish, this is not preferred. This is primarily because it would not be a very effective way to stimulate the fish to bite at and consume the food in the water. It would also not be very cost effective. It is preferred that the amino acids of the present invention, or a precursor thereof, be incorporated into the fish food. Any suitable method can be used for incorporating the amino acids into the food. For example, the amino acids, in crystalline form, can be added directly to the food during its preparation—preferably prior to shaping and drying. For food which has already been produced, an aqueous solution, preferably saturated, of the amino acids, or a precursor thereof, can be sprayed onto the food, then dried. As previously mentioned, it is also within the scope of this invention to use precursors that lead to the production of the amino acids of the present invention. For example, proteins can be used, which when subjected to the action of proteolytic enzymes, produce amino acids, including L-proline, L-alanine, and L-arginine in the appropriate concentrations. Of course, other amino acids are also produced.

For fish which have been put under stres by hatchery to pond transfer, it is preferred that the fish be fed with feed about one hour after dusk with feed containing the one or more free amino acids of the present invention. The fish should be fed in darkness for at least the first five days after said transfer.

It will be appreciated that the amino acids of the present invention can be used with a fishing lure to entice the fish to take the lure or hook.

The following examples are presented to illustrate various aspects of the present invention and are not to be taken as being limiting in any way.

EXAMPLE 1

Figure 1A:
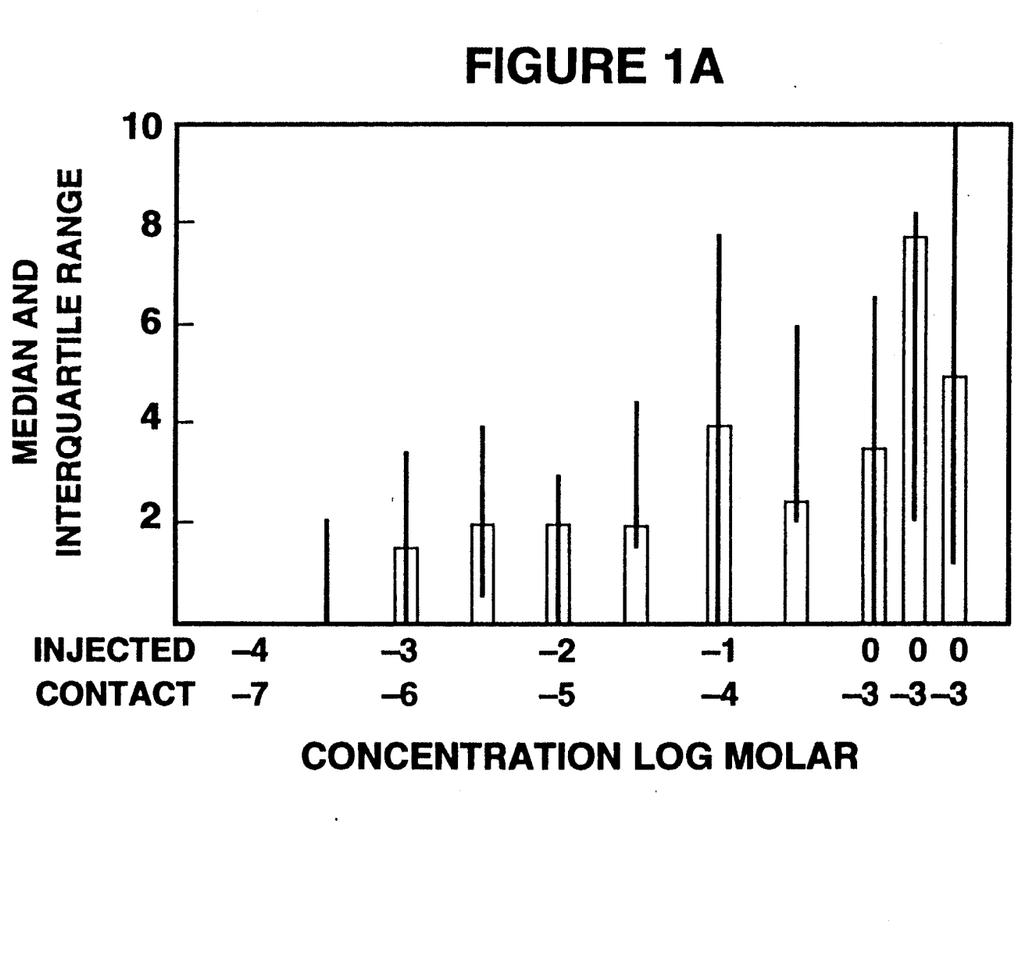
FIGS. 1A, 1B, and 1C are graphic representations of the results obtained in Example 1 hereof wherein the snapping and biting behavior of anosmic ictalurid catfish were investigated as a function of concentration of L-alanine and L-arginine.
Figure 1B:
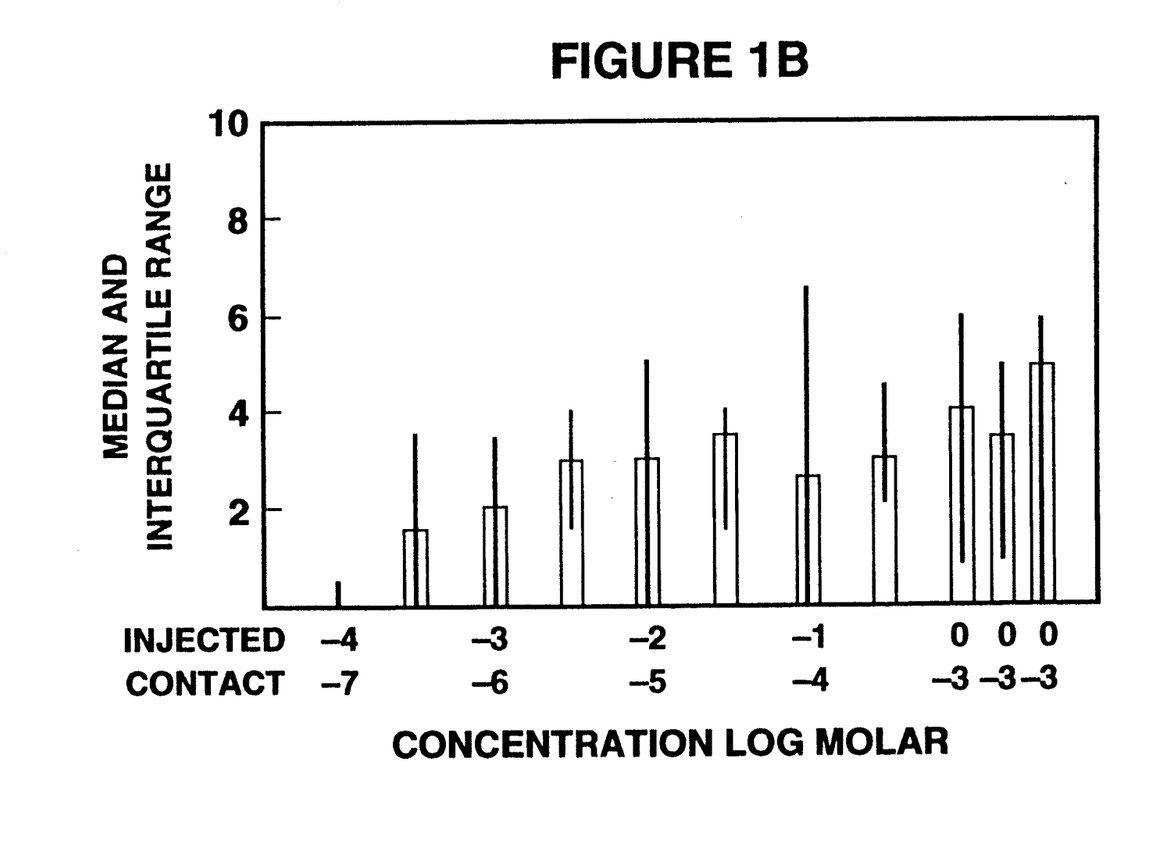
Figure 1C:
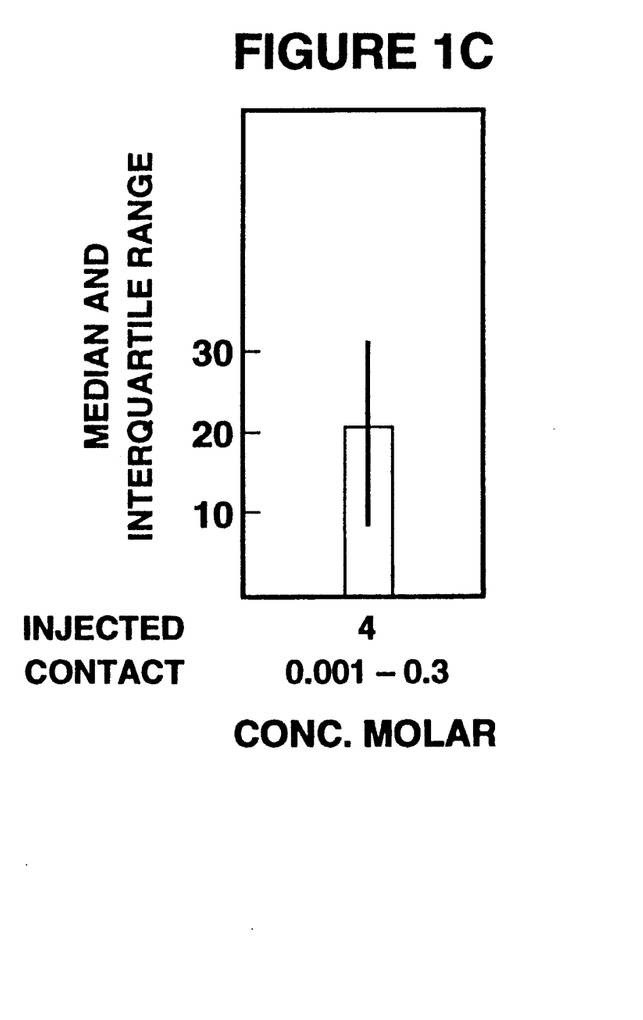

The biting behavior of anosmic ictalurid catfish to the free amino acids L-alanine and L-arginine at 9 different concentrations was investigated. The example was conducted by taking ictalurid catfish and making them anosmic (removing their olfactory receptors) by an appropriate surgical procedure under anesthetic conditions. Each fish was kept in an aquaria containing black gravel to avoid an "escape excitatory state". Each fish was fed daily with fresh fish meat until total recovery of their surgical wounds. The catfish were presented with 1 ml of solution of the tested amino acid from hydraulically operated Pasteur pipettes and the behavioral responses were video-recorded. The number of bites (snaps) and movements of the hyoid region of the fish were counted from slow motion frame by frame replay. The resulting data are presented as median results and interquartile range in FIGS. 1A, 1B, and 1C hereof. By interquartile range is meant that $\frac{1}{4}$ of the results were lower and $\frac{1}{4}$ of the results were larger than the range presented in the bars of the FIGURE.

EXAMPLE 2

Figure 2:
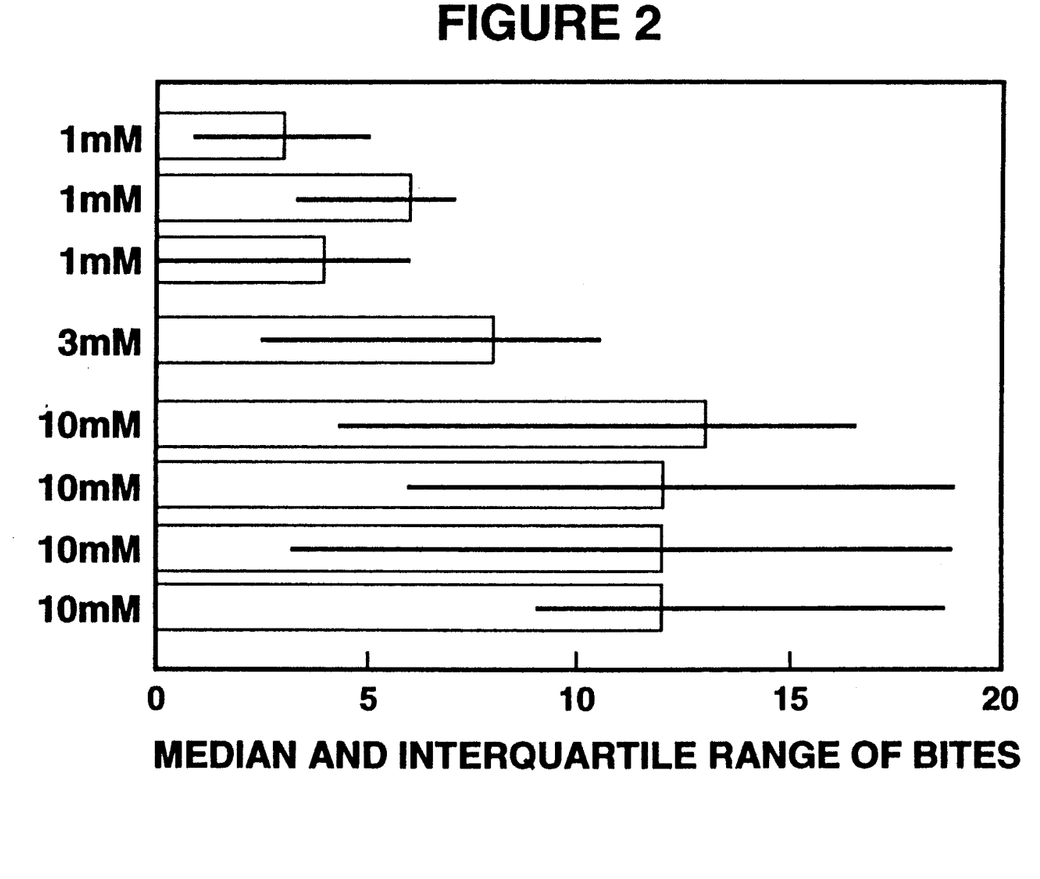
FIG. 2 is a graphic representation of the results obtained in Example 2 hereof, which was conducted in accordance with the procedure of Example 1, but using different concentrations of L-proline.

The above procedure was followed except that L-proline was used instead of L-alanine and L-arginine. The results of this example are shown in FIG. 2 hereof.

EXAMPLE 3

Figure 3:
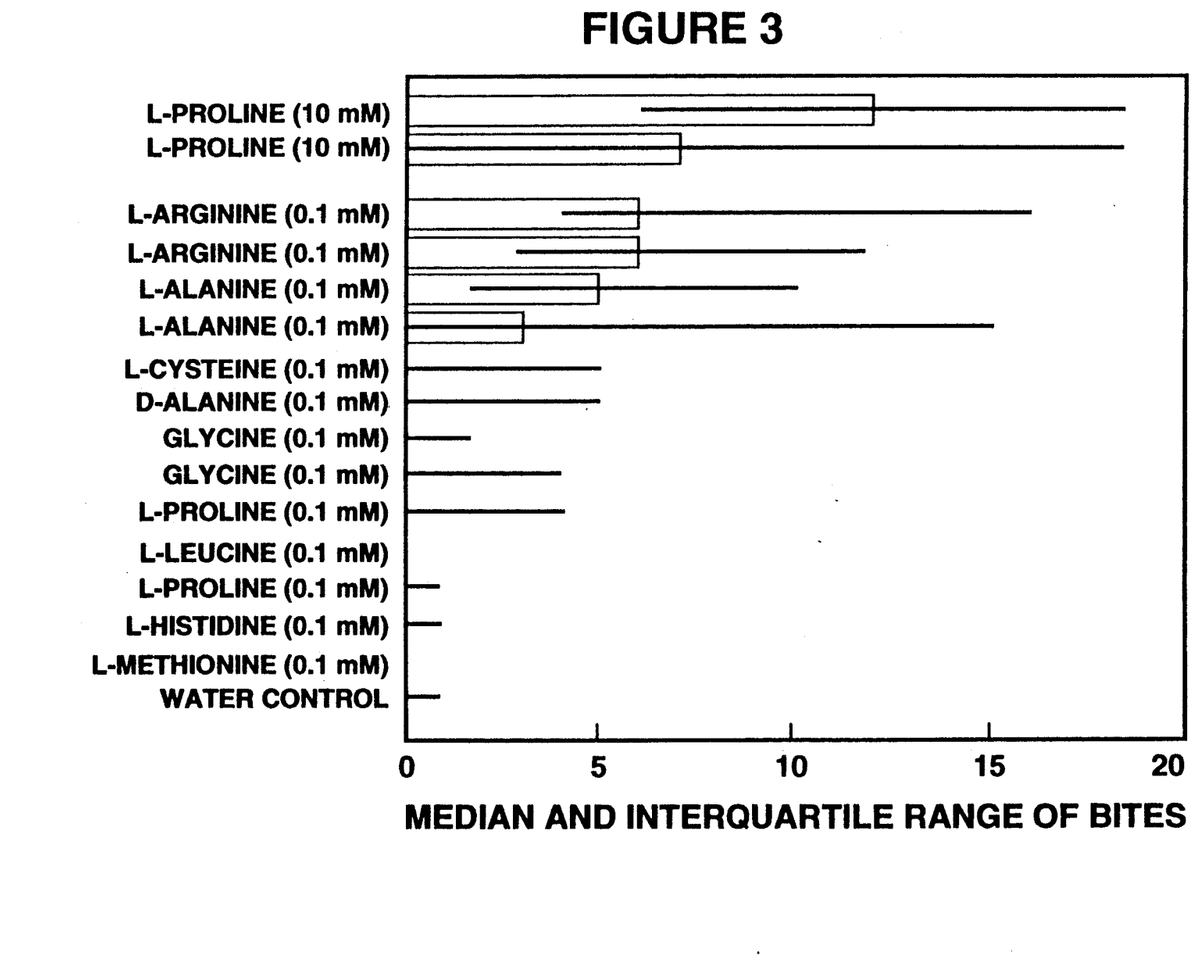
FIG. 3 is a graphic representation of the results obtained in Example 3 hereof which was also conducted in accordance with the procedure of Example 1, except that various other amino acids were used.

The procedure of Example 1 was followed except that various other amino acids were used along with the three of the present invention. The results are presented in FIG. 3 hereof.

EXAMPLE 4

The swimming responses of naive ictalurid catfish to L-proline, a combination of the three amino acids of the present invention, and some commercial attractants was tested. The naive catfish had no previous experience with the tested compounds. Intact catfish were, for these experiments, maintained individually in black gravel aquaria and regularly fed flounder meat until the beginning of the experiments of this example. The swimming response presented is the quantity of swimming measured in terms of turns greater than 90 degrees in a rectangular aquaria. The response to flounder water is a response to water in which slices of flounder meat were stirred for 10 minutes. For comparison, conditioned responses to single chemicals have medians from 40 to 70 turns in 90 seconds and frightened fish would not swim to the chemical stimulation at all and the medians and the upper quartiles would be 0. The swimming behavior acts to bring fish close to the stimulation source. The fish tend to swim more to chemical stimuli which are familiar to them from previous experience than to stimuli presented for the first time. The results are graphically shown in FIG. 4 hereof.

EXAMPLE 5

Figure 5:
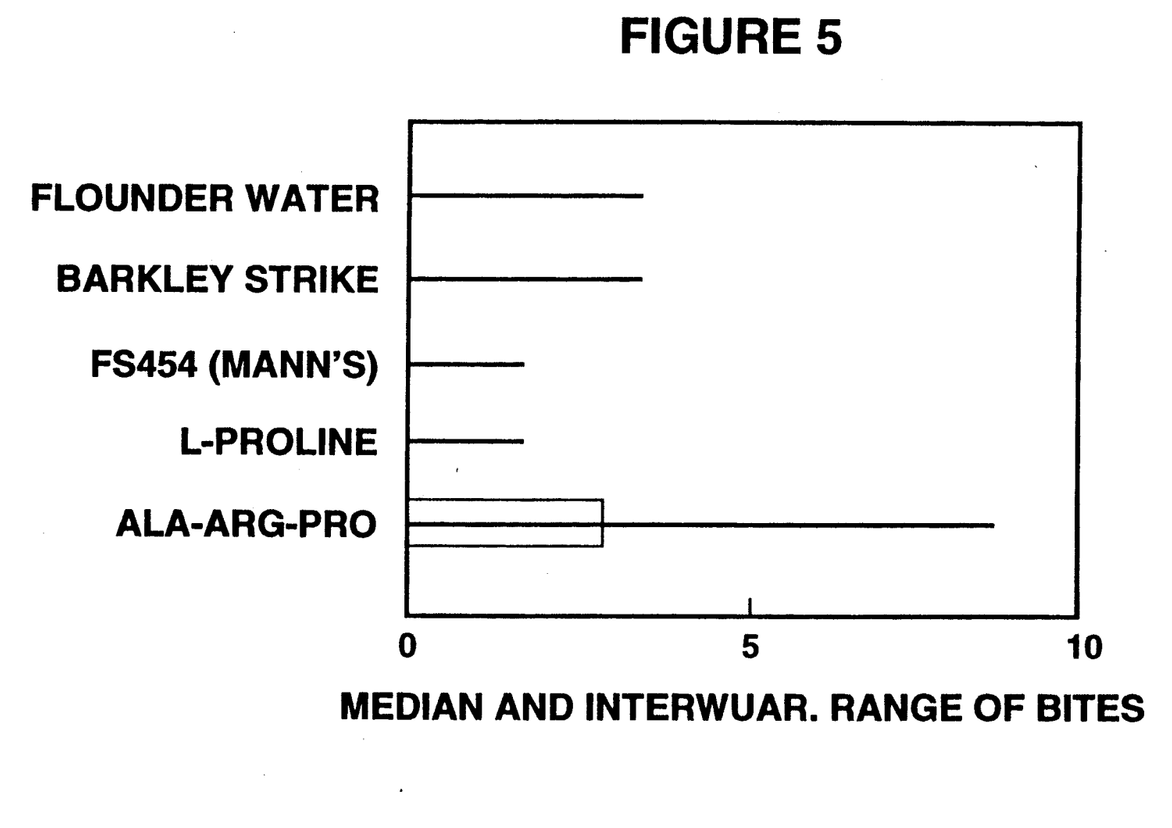
FIG. 5 hereof is a graphic representation of the results obtained in Example 5 hereof wherein the biting behavior of naive ictalurid catfish were determined for various attractants.

The biting behavior of ictalurid catfish to L-proline, a combination of all three of the amino acids of the present invention, flounder water, and to various commercial attractants was tested. The naive catfish were maintained for 2 months in the test aquaria and with no previous experience with the tested material. The catfish were presented with 1 ml of solution of the tested material from hydraulically operated Pasteur pipettes. The solutions were prepared as follows: flounder water was water in which slices of flounder meat were maintained for 10 minutes; an undiluted solution of Berkeley Strike For Catfish was injected into aquaria, and a saturated water solution of Mann's FS 454 was prepared by shaking water in glass containers coated with the FS paste. The mixture of the amino acids of the present invention was: 0.5M L-proline, 0.1M L-alanine, and 0.1M L-arginine; and the L-proline used alone was 1M. The biting behavior of the catfish is an innate response which is not modified by experience; however, this response can also be inhibited by any stimulus which frightens the fish. The results were obtained by video recording, as in Example 1 hereof, and are graphically represented in FIG. 5 hereof.

There are of course other alternate embodiments which are obvious from the foregoing descriptions of the invention which are intended to be included within the scope of the invention as defined by the following claims.

What is claimed is:

1. An improved ictalurid catfish food which comprises an effective amount of: (a) one or more of the free amino acids selected from the group consisting of L-alanine, L-arginine, and L-proline; or (b) a protein precursor of said amino acids, that upon the action of a proteolytic enzyme will produce said one or more amino acids, or a mixture of (a) and (b); wherein said effective amount is an amount which will release the snapping and biting response of the fish.

2. The food of claim 1 wherein the overall amount of the one or more free amino acids in up to about 5 wt. %.

3. The food of claim 2 wherein the overall amount of the one or more free amino acids is up to about 1 wt. %.

4. The food of claim 3 wherein up to about 0.1 wt. % of the total weight of the food is the free amino acid portion.

5. The food of claim 4 wherein all three of the free amino acids is present.

6. The food of claim 1 wherein the one or more free amino acids is present in an amount which will produce, when placed in a body of water, plumes having a concentration of one or more of: at least about 0.001M L-alanine, at least about 0.001M L-proline, and at least about 0.0001M L-arginine.

7. The food of claim 6 wherein all three of the free amino acids is present.

* * * * *

UNITED STATES PATENT AND TRADEMARK OFFICE
CERTIFICATE OF CORRECTION

PATENT NO.   : 5,171,587

DATED        : December 15, 1992

INVENTOR(S)  : Caprio, et al.

Figure 4:
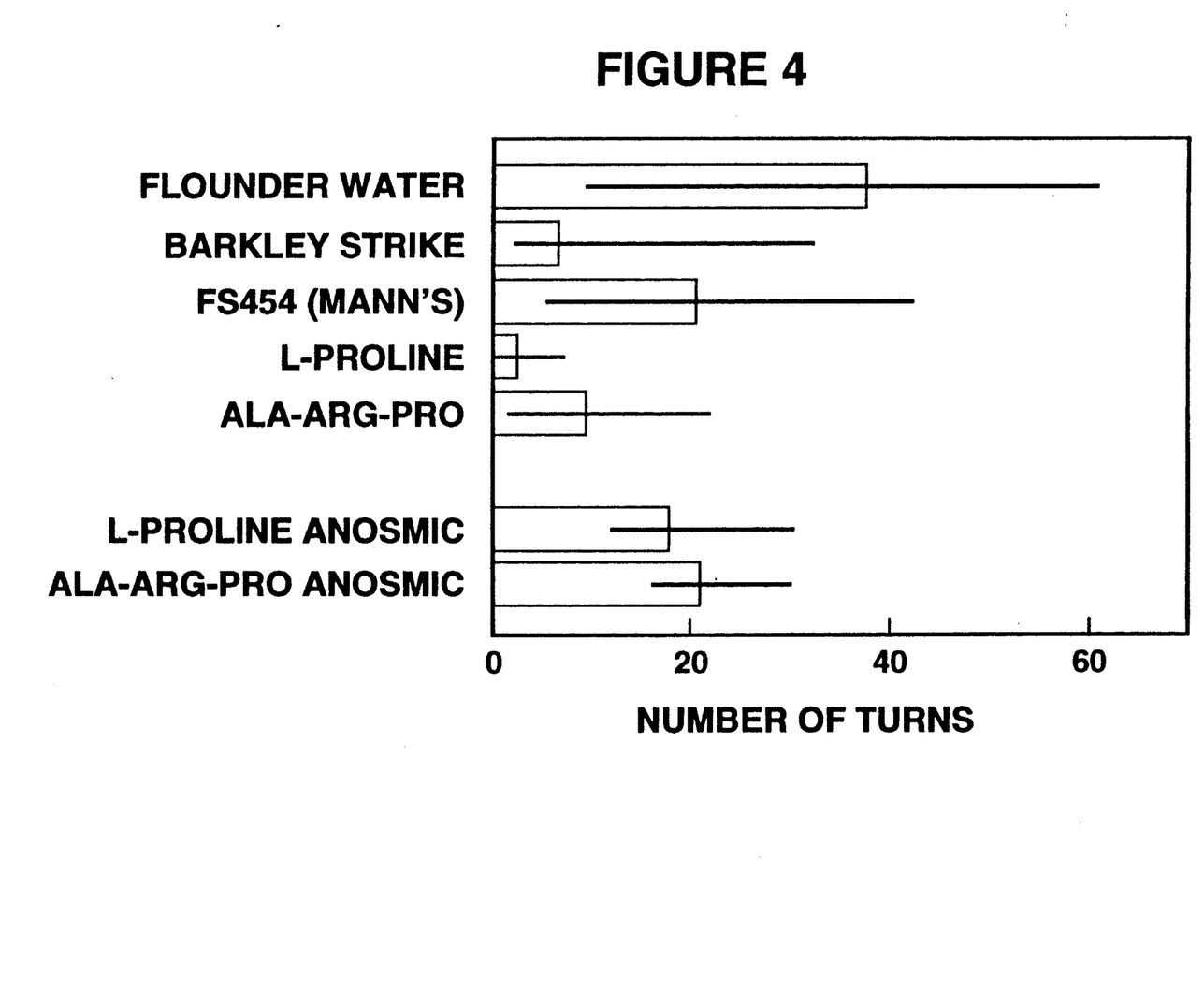
FIG. 4 is a graphic representation of the results obtained in Example 4 hereof wherein the swimming response was determined for naive anosmic ictalurid catfish to various attractants, including the amino acids of the present invention.

It is certified that error appears in the above-identified patent and that said Letters Patent is hereby corrected as shown below:

In the drawings, Sheet 6, Figure 4, "BARKLEY" should read --BERKLEY--. Sheet 7, Figure 5, "BARKLEY" should read --BERKLEY--; and "INTERWUAR." should read --INTERQUAR.--. In Column 3, Line 25, add new paragraph --For all of the above figures, each bar represents a test group consisting of 11 fish.--. Column 5, line 27-28, delete "range presented in the bars of the FIGURE." and insert therefor --median presented.--. Column 6, Line 15, "Berkeley" should read --Berkley--. In the title page, "Yugoslavia" should read --Slovenia--.

Signed and Sealed this

Sixteenth Day of November, 1993

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO.       : 5,171,587
APPLICATION NO. : 07/742361
DATED            : December 15, 1992
INVENTOR(S)      : Caprio et al.

It is certified that error appears in the above-identified patent and that said Letters Patent is hereby corrected as shown below:

In the specification, Column 1, Line 9, add new paragraph, as second paragraph of the specification
--Part of the work during the development of this invention was made with government support under Grant Number BNS 8819772 awarded by the National Science Foundation and under Grant Number N00014-90-J-1583 awarded by the Office of Navel Research. The U.S. Government has certain rights in the invention--.

Signed and Sealed this

Twentieth Day of February, 2007

JON W. DUDAS
*Director of the United States Patent and Trademark Office*